United States Patent [19]

Ohtsubo et al.

[11] 4,239,358
[45] Dec. 16, 1980

[54] ALARM DEVICE CONTROL SYSTEM IN A CAMERA

[75] Inventors: Yoshiaki Ohtsubo, Kawasaki; Shigeo Akasaka, Kodaira; Sakuji Watanabe, Warabi; Mikio Takemae, Yokohama; Ryuzo Motoori, Kawasaki; Yasunori Kitamura, Tokyo, all of Japan

[73] Assignee: Nippon Kogaku K.K., Tokyo, Japan

[21] Appl. No.: 73,425

[22] Filed: Sep. 7, 1979

[30] Foreign Application Priority Data

Sep. 14, 1978 [JP] Japan ............................. 53-125458[U]

[51] Int. Cl.³ ............................................ G03B 17/18
[52] U.S. Cl. .................................. 354/60 E; 354/289
[58] Field of Search ..................... 354/53, 60 R, 60 E, 354/60 L, 289

[56] References Cited

U.S. PATENT DOCUMENTS

| 3,648,053 | 3/1972 | Sato | 354/51 X |
| 4,145,130 | 3/1979 | Shimizu et al. | 354/60 R X |

Primary Examiner—Michael L. Gellner
Attorney, Agent, or Firm—Fitzpatrick, Cella, Harper & Scinto

[57] ABSTRACT

An alarm device control system in a camera having a metering device for measuring the brightness of an object and generating an output corresponding to a proper exposure value, and an alarm device for receiving the output of the metering device as input and giving an alarm when the proper exposure value does not satisfy predetermined photographing conditions. The system comprises switch means adapted to become operative in response to operation of a shutter release member, and a preparatory power source device for maintaining the metering device operative for a predetermined time after the switch means has become inoperative.

4 Claims, 3 Drawing Figures

ALARM DEVICE CONTROL SYSTEM IN A CAMERA

BACKGROUND OF THE INVENTION

1. Field of the Invention

This invention relates to an alarm circuit control system in a camera for controlling power supply to an alarm circuit for the shutter speed or the like of the camera and for placing the alarm circuit into operative condition only when the operator of the camera desires it.

2. Description of the Prior Art

In a camera, the alarm circuit gives a visual or aural alarm to the operator of the camera when a proper shutter speed determined by a metering circuit which measures the brightness of an object exceeds the limit of hand-held shooting or departs from the control range of an exposure control circuit. Such an alarm is originally sufficient if it draws the attention of the photographer, and the alarm does not always mean that photography itself is impossible. It is therefore conceivable that a switch or like means for stopping the generation of an alarm is provided in the alarm circuit.

SUMMARY OF THE INVENTION

It is an object of the present invention to provide an alarm circuit control system which enables selection of the operation or non-operation of the alarm circuit without hampering the operability of a camera.

The invention will become fully apparent from the following detailed description of an embodiment thereof taken in conjunction with the accompanying drawings.

DESCRIPTION OF THE PREFERRED EMBODIMENTS

An embodiment of the alarm circuit control system according to the present invention will hereinafter be described by reference to the accompanying drawings.

Figure 1:
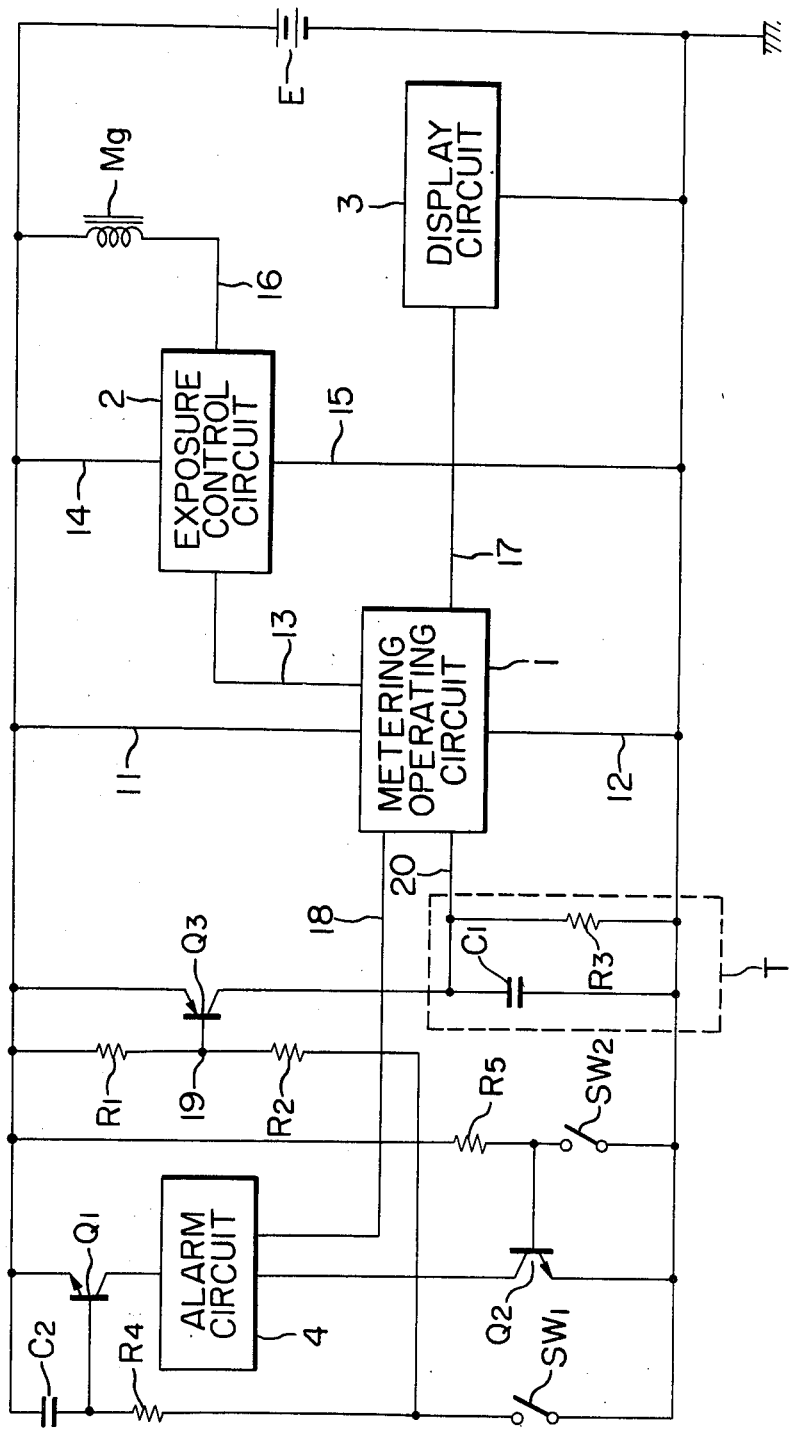
FIG. 1 is a circuit diagram showing an embodiment of the present invention.

FIG. 1 shows an embodiment of the present invention. A metering operation circuit 1 is operated by being supplied with power from a DC power source E through lead wires 11 and 12. The metering operation circuit 1 is a circuit which measures the brightness of an object and determines a proper shutter speed from exposure parameters such as the then set aperture value and ASA film speed and puts out a signal representing the proper shutter speed, through output lead wires 13, 17 and 18. In FIG. 1, three output lead wires 13, 17 and 18 are shown, but these may be arranged into a single lead wire because the signals produced in these lead wires may be identical to one another. An exposure control circuit 2 is connected to one output lead wire 13 of the metering operation circuit 1. The exposure control circuit 2 may be a conventional one. The exposure control circuit 2 in the present embodiment is supplied with power from the DC power source E through lead wires 14 and 15, and a magnet Mg for retaining a rearward shutter curtain (not shown) is connected to the output lead wire 16 of the exposure control circuit. The function of the exposure control circuit 2 in the present embodiment is to deenergize the magnet Mg in a time corresponding to a proper shutter speed after movement of a forward shutter curtain (not shown) and to move the rearward shutter curtain. The proper shutter speed determined by the metering operation circuit 1 is visually displayed within a finder by a display circuit 3 connected to one output lead wire of the metering operation circuit 1.

An alarm circuit 4 is connected to the other output lead wire 18 of the metering operation circuit 1. The alarm circuit 4 is supplied with power from the DC power source E through a PNP transistor $Q_1$ and an NPN transistor $Q_2$. The alarm circuit 4 compares a signal representing a proper shutter speed received from the lead wire 18 with a reference signal representing photographing conditions such as the limit of hand-held shooting and the control range of the exposure control circuit 2 and generates an aural and/or visual alarm when the proper shutter speed does not satisfy any of these photographing conditions. A capacitor $C_2$ is connected between the base and emitter of the transistor $Q_1$, and the base is connected to one terminal of a switch $SW_1$ through a resistor $R_4$. The other terminal of the switch $SW_1$ is connected to the negative pole of the power source E. The switch $SW_1$ is a half depression switch adapted to be closed in a half depression state (first stage) of the release button of the camera. The base of the transistor $Q_2$ is connected to the positive pole of the power source E through a resistor $R_5$ and to the negative pole of the power source E through a switch $SW_2$. The switch $SW_2$ is a mirror switch adapted to be closed during the upward movement of the mirror of the single lens reflex camera.

The half depression switch $SW_1$ is also connected to the base of a PNP transistor $Q_3$ through an intermediate junction 19 between voltage dividing resistors $R_1$ and $R_2$. The emitter of the transistor $Q_3$ is connected to the positive pole of the DC power source E, and the collector thereof is connected to the negative pole of the power source E through a time limit circuit T comprising a capacitor $C_1$ and a resistor $R_3$ and also connected to the terminal 20 of the metering operation circuit 1. The metering operation circuit 1 effects the above-described metering operation when this terminal 20 is at high level, and is deenergized when the terminal 20 is at low level.

Operation will now be described. When the release button is half depressed (first stage) during the photographing operation or the photographing preparation operation of the camera, the switch $SW_1$ is closed. By this, the base potential of the transistor $Q_3$ drops to the divided voltage value of the voltage E determined by the resistors $R_1$ and $R_2$ to turn on the transistor $Q_3$ and cause the potential of the terminal 20 of the metering operation circuit 1 to reach a high level. At the same time, the capacitor $C_1$ is charged. Thereupon, the metering operation circuit 1 starts its metering operation, and a signal representing the proper shutter speed determined thereby is received by the alarm circuit 4 through a lead wire 18. When the switch $SW_1$ is closed, the capacitor $C_2$ starts to be charged at a predetermined time constant through the resistor $R_4$, but the transistor $Q_1$ conducts when the charging voltage of the capacitor $C_2$ exceeds a certain threshold value. The time constant of this circuit is set to a very small value. On the other hand, the transistor $Q_2$ remains conductive because the switch $SW_2$ is not yet closed at this stage, and therefore the alarm circuit 4 becomes capable of effecting the proper shutter speed comparing and alarming operation upon conduction of the transistor $Q_1$. Thus, when the proper shutter speed received by the lead wire 18 exceeds the limit of hand vibration or departs from the control range of the control circuit 2, an aural alarm by a buzzer or a visual alarm by a light-emitting element is given.

Next, when the release button is returned from its half-depressed condition to its initial condition, the transistor $Q_1$, becomes non-conductive to stop the power supply to the alarm circuit 4, whereupon the comparing and alarming operation thereof is stopped. Simultaneously therewith, the transistor $Q_3$ also becomes non-conductive but the potential of the terminal 20 of the metering operation circuit 1 gradually drops in accordance with the time constant of the time limit circuit comprising the resistor $R_3$ and the capacitor $C_1$ and therefore, the metering operation circuit 1 continues its metering operation for a predetermined period of time thereafter. Thus, in this condition, even if the alarm circuit 4 is in inoperable state, the metering operation circuit 1 continues to function for a predetermined period of time.

When the photographing state is entered with the release button fully depressed (second stage) from its half-depressed condition, the mirror (not shown) of the camera moves upwardly to thereby close the switch $SW_2$ and reduce the base potential of the transistor $Q_2$ to the emitter potential, so that the transistor $Q_2$ becomes non-conductive to cut off the power supply to the alarm circuit 4, which thus becomes inoperable. On the other hand, the metering operation circuit 1 continues to be supplied with power and therefore, the metering operation is taking place and in accordance with the proper shutter speed determined by the metering operation circuit 1, the exposure control circuit 2 effects the shutter control operation in response to the second stage of the release button.

Description will now be made of the operation of the camera provided with such a control system.

Where it is desired to render the alarm circuit 4 operable as the photography preparation operation, the release button may be maintained at half-depressed condition. In this state, both the metering operation circuit 1 and the alarm circuit 4 are continuously supplied with power. Also, where no alarm is necessary, namely, where it is desired to neglect an alarm even if it is produced, the alarm circuit 4 maintains its inoperable condition because, if the release button is half-depressed and returned to its initial condition immediately thereafter, the switch $SW_1$ is returned to its initial position before the capacitor $C_2$ is sufficiently charged to turn on the transistor $Q_1$. Since, however, the potential of the terminal 20 exceeds the threshold value for a period of time corresponding to the time constant of the time limit circuit $C_1$, $R_3$, the metering operation circuit 1 continues its metering operation for that period of time even after the switch $SW_1$ has been returned to its initial condition. Thus, when the photography preparation operation, namely, the selection of the aperture value, is effected, it is possible to select the power supply to the alarm circuit 4 in accordance with the desire of the operator.

The alarm circuit 4 is also inoperative when the photographing operation is entered with the release button depressed to the second stage at a stroke. In a usual camera, several tens of milliseconds is required from the closing of the switch $SW_1$ till the upward movement of the mirror, but since the values of the capacitor $C_2$ and the resistor $R_4$ are chosen such that the time required from the closing of the half depression switch $SW_1$ until the base potential of the transistor $Q_1$ reaches the threshold value at which the transistor $Q_1$ conducts after the capacitor $C_2$ is charged is longer than that, the mirror switch $SW_2$ is closed to render the transistor $Q_2$ non-conductive before the transistor $Q_1$ conducts. Therefore, in this case, the alarm circuit 4 is not operated. The usual auto exposure control camera is provided with a memory circuit (usually a capacitor) for temporally storing the metering output at the same time with the upward movement of the mirror, while in a camera of the type in which not the output of the memory circuit but the metering output is directly applied to the alarm circuit, the light incident on the metering operation circuit 1 is intercepted by the upward movement of the mirror and therefore, the signal representing the proper shutter speed which is the output of the circuit 1 may temporarily exhibit a value exceeding the limit of hand-held shooting or departing from the control range. Even in such a case, the power supply to the alarm circuit 4 is cut off at the time point of the upward movement of the mirror in the power supply control circuit of the present invention and therefore, no alarm is generated.

Figure 2:
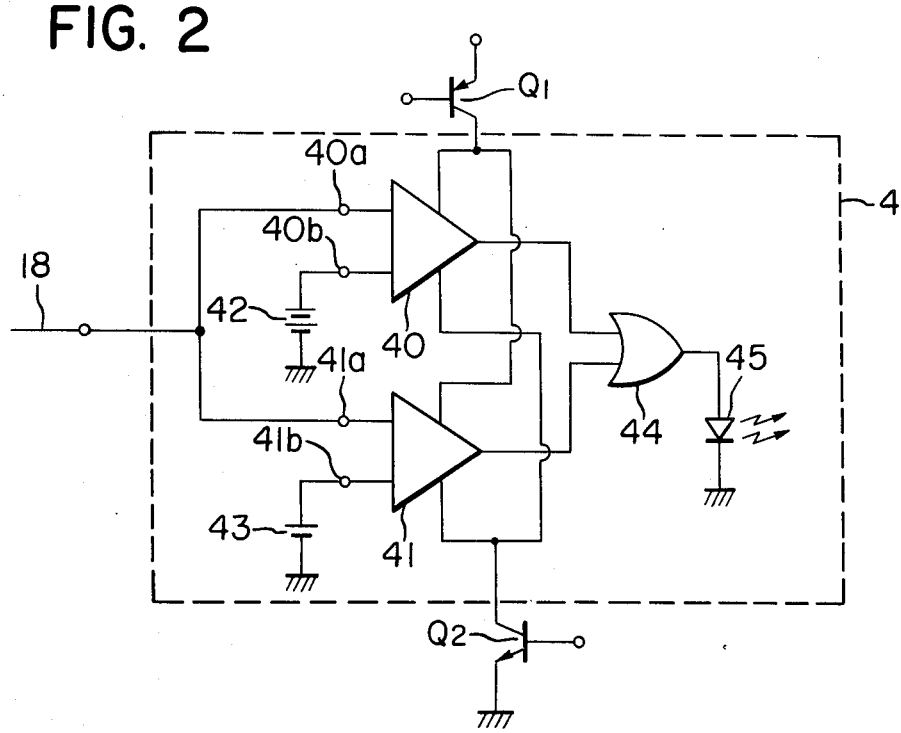
FIGS. 2 and 3 show portions of FIG. 1 in greater detail.

An example of the alarm circuit 4 will now be described briefly by reference to FIG. 2. The present example of the alarm circuit 4 is used with the metering operation circuit 1 which puts out a high level signal as a signal representing the proper shutter speed when the shutter speed is slow and puts out a low level signal when the shutter speed is fast. The alarm circuit 4 has comparator circuits 40 and 41. One input terminal 40a of the comparator circuit 40 receives as input a signal representing the proper shutter speed (which signal may actually be a DC voltage) through an output lead wire 18, and the other input terminal 40b of the comparator circuit 40 receives as input a voltage 42 corresponding to the limit of hand vibration. The comparator circuit 40 puts out a high level voltage when one input terminal voltage is greater than the other input terminal voltage. One input terminal 41a of the comparator circuit 41 receives as input a signal representing the proper shutter speed through the output lead wire 18 and the other input terminal 41b of the comparator circuit 41 receives as input a voltage 43 corresponding to the case where the outside light is too bright and the shutter speed departs from the exposure control range. The comparator circuit 41 puts out a high level voltage when one input terminal voltage 41a is smaller than the other input terminal voltage 41b. When one of the comparator circuits 40 and 41 is putting out a high level voltage, the OR gate 44 of the alarm circuit 4 puts out a high level voltage to drive a light-emitting diode 45 or the like and thereby effect an alarming operation. The comparator circuits 40 and 41 have respective terminals for the power source, and the transistors $Q_1$ and $Q_2$ described in connection with FIG. 1 are series-connected between the power source E of FIG. 1 and the terminals of the respective circuits 40 and 41 for the power source.

Figure 3:
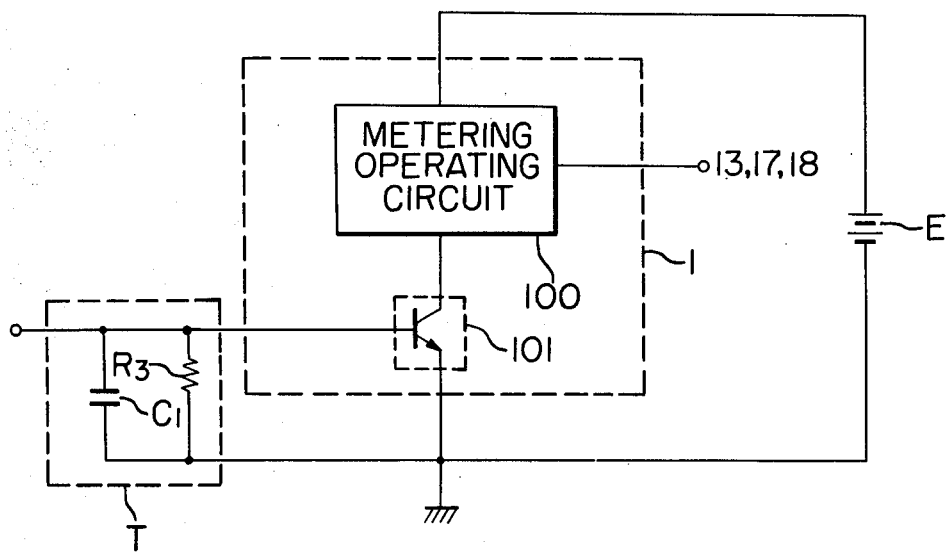

The output lead wires 13, 17 and 18 of the metering operation circuit 1 described in connection with FIG. 1 may be a common output lead wire (namely, identical signals) as shown in FIG. 3. Also, the output of the time limit circuit T comprising the capacitor $C_1$ and the resistor $R_3$ is used to control the base voltage of a switching transistor 101 series-connected between the metering operation circuit body 100 and the power source E, as shown in FIG. 3. Accordingly, when the output of the time limit circuit T is greater than a predetermined voltage (high level), the transistor 101 conducts and the metering operation circuit body 100 is supplied with power to become operative and, when the output of the time limit circuit T is smaller than the predetermined voltage (low level), the transistor 101 becomes non-conductive and the metering operation circuit body 100 is not supplied with power to become inoperative. In the example shown in FIG. 3, the transistor 101 series-connected between the metering operation circuit body 100 and the power source E is controlled to select the operation or non-operation of the metering operation circuit body 100, whereas design may also be made such that the base of an arbitrary transistor (not shown) constituting the metering operation circuit body 100 is controlled as in the well-known technique.

Thus, the alarm circuit control system in the camera according to the present invention is constructed such that power is supplied to the alarm circuit upon half depression of the release button and the metering circuit maintains its operative condition for a predetermined period of time even after return of the release button to its initial condition, whereby it is possible to control the power supply to the alarm circuit as desired without operating an exclusive switch and moreover, to effect the usual photography preparation operation without any impediment.

We claim:

1. An alarm device control system in a camera having a metering device (1) for measuring the brightness of an object and generating an output corresponding to a proper exposure value, and an alarm device (4) for receiving the output of said metering device as input and giving an alarm when the proper exposure value does not satisfy predetermined photographing conditions such as the limit of hand-held shooting and the like, said system comprising:

switch means ($SW_1$, $R_4$, $C_2$, $Q_1$, $R_2$, $R_1$, $Q_3$) adapted to become operative in response to operation of a shutter release member, said metering device and said alarm device being related to said switch means such that said metering device is operated when said switch means becomes operative and that said alarm device is operated when said switch means becomes operative and said alarm device becomes inoperative when said switch means becomes inoperative; and a preparatory power source device ($C_1$, $R_3$) for maintaining said metering device operative for a predetermined time after said switch means has become inoperative.

2. An alarm device control system according to claim 1, wherein said switch means includes:

a first switch ($SW_1$) directly controlled to become operative by operation of said shutter release member;

actuating means ($R_1$, $R_2$, $Q_3$) for actuating said metering device by operation of said shutter release member; and delay means ($C_2$, $R_4$, $Q_1$) for actuating said alarm device a predetermined time later than the operation of said first switch.

3. An alarm device control system according to claim 2, wherein said camera has a mirror switch ($SW_2$) adapted to become operative when a viewing movable mirror is retracted from a picture-taking light path, and said mirror switch ($SW_2$) is related to said alarm device (4) so as to render said alarm device inoperative even if said first switch ($SW_1$) is operated.

4. An alarm device control system according to claim 2, wherein said preparatory power source device is a time constant circuit, the output of which is at a predetermined value during the operation of said first switch and is gradually decreased by non-operation of said first switch, and said metering device receives the output of said time constant circuit as input and becomes inoperative when said output is below a predetermined value.

* * * * *